United States Patent [19]

Hurd et al.

[11] Patent Number: 4,620,786
[45] Date of Patent: Nov. 4, 1986

[54] CAMERA PLATEN FILM POSITIONING APPARATUS

[75] Inventors: Bruce Hurd, Ridgefield, Conn.; Quentin Vauhn, Hollywood, Fla.

[73] Assignee: Visual Graphics Corp., Tamarac, Fla.

[21] Appl. No.: 791,458

[22] Filed: Oct. 25, 1985

[51] Int. Cl.⁴ ............................................. G03B 27/58
[52] U.S. Cl. ........................................ 355/72; 355/74
[58] Field of Search .................................. 355/72, 74

[56] References Cited

U.S. PATENT DOCUMENTS

| | | |
|---|---|---|
| 929,809 | 8/1909 | Willyerd . |
| 1,745,900 | 2/1930 | Lowen . |
| 3,167,996 | 2/1965 | Adler . |
| 3,208,335 | 9/1965 | Doherty . |
| 3,240,115 | 3/1966 | Robbins et al. . |
| 3,283,647 | 11/1966 | Fairbanks et al. . |
| 3,354,804 | 11/1967 | Jones . |
| 3,437,409 | 4/1969 | Friedel . |
| 3,615,133 | 10/1971 | Fairbanks et al. . |
| 3,632,204 | 1/1972 | Friedel . |
| 4,016,577 | 4/1977 | Hensy et al. . |

Primary Examiner—Monroe H. Hayes
Attorney, Agent, or Firm—Albert F. Kronman

[57] ABSTRACT

Apparatus for positioning, centering and holding film within a large format industrial camera for exposure within a light-tight exposure chamber, the bottom of which holds a transparent plate to receive the film at the focal plane, a two piece platen of flat rigid material, hinged together in abutting relationship, is carried above the transparent plate. One of the platen pieces is provided with a series of elongated slots therethrough to receive a series of elongated stops. The stops are yieldably carried by said platen piece for movement through the slots in the platen piece into the path of the desired size of film as it is slid across the plate and under the platen pieces. A control arm of generally "L" shape is swingably carried on each of the elongated stops. The control arms are selected for the desired film size and can be located and swung into position by a single finger operation without need for seeing them. In one position the control arms urge the desired stop into the path of the film to correctly position it upon the plate for exposure. In the other position the control arm permits the stop to move out of the path of the film. After film positioning the two piece platen is brought down upon the film to hold it flat against the plate for film exposure.

8 Claims, 7 Drawing Figures

CAMERA PLATEN FILM POSITIONING APPARATUS

BACKGROUND OF THE INVENTION

This invention is an improvement upon U.S. Pat. No. 4,016,577 issued Apr. 5, 1977, which is incorporated herein by reference. The reference patent discloses a photoprinting and processive device suitable for the exposure and developing of both black and white and full color photosensitive material without the need for a dark room. A platen, film positioning structure was also disclosed therein in which selective positioned stops could be brought into the path of the photosensitive material as it was being moved upon the platen to orient with material with respect to the projected image. The stops were "L" shaped and adapted to engage one corner of the photosensitive material. Sliding latches were used to move the stops into or out of the path of the photosensitive material.

The present invention provides a platen and film positioning apparatus which more positively locates the film and is more compatible with the operation of the camera.

Another object of the present invention is to provide an easily operated film stop and positioning apparatus which is quickly located and operated from within the camera without need for visual reference. Still another object of the present invention is to provide a film stop and orienting structure which will handle a wide variety of film sizes.

A feature of the present invention is its rapid one finger stop setting and releasing mode of operation.

A further feature of the present invention is its balanced symmetrical structure of the stop and positioning members which prevents skewing.

SUMMARY

The camera platen film positioning apparatus according to the present invention includes, within a light-tight camera exposure section enclosure, a transparent plate horizontally disposed in the film plane of the camera. A hinged platen having selectively positioned stops is carried within the enclosure overlying and substantially parallel with the plate. Photosensitive material in the form of flat sheets, herein referred to as "film", is received upon the plate beneath the platen. Elongated stops capable of intercepting the leading edge of said film as it is led across the plate to the desired position for exposure are controlled by the manipulation of one or more swingable arms carried on the stops. In one position of the swingable arms, a portion of the hinged platen will depress those arms which have been preset for a desired film size, causing the stops to be brought into the path of the film and thereby positioning and squaring it. A simple rotation of the swingable arms removes the stops from the path of the film when so desired.

BRIEF DESCRIPTION OF THE DRAWING

In the accompanying drawings, forming a part hereof, similar reference characters designate corresponding parts, and in which.

GENERAL DESCRIPTION

Figure 1:
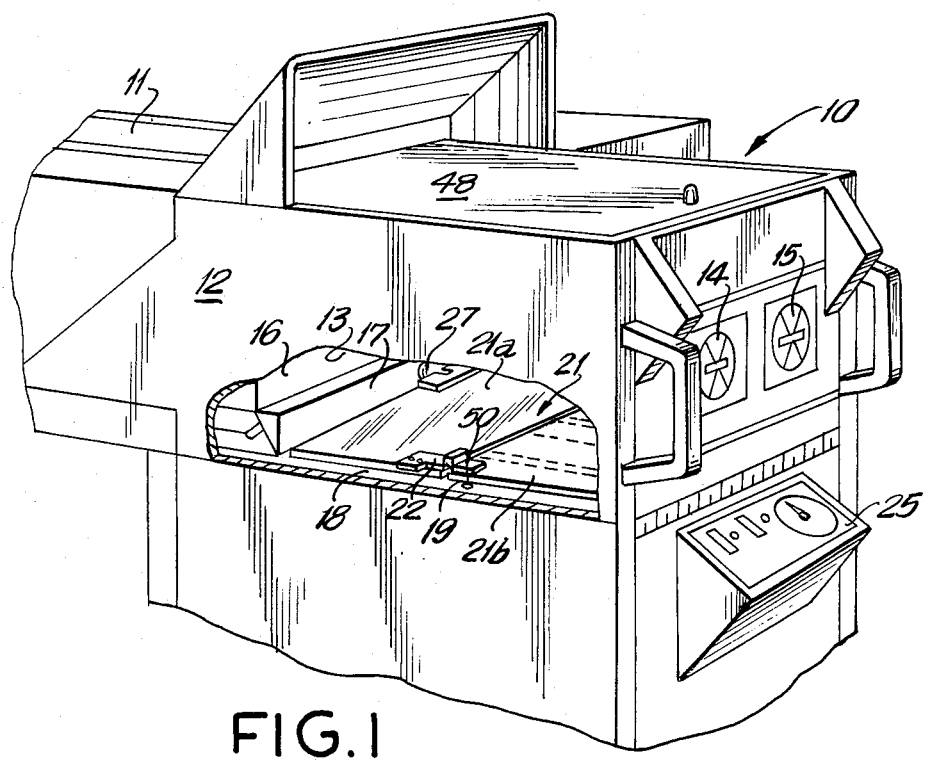
FIG. 1 is a perspective fragmentary view, partly broken away, of a camera showing a complete embodiment of the invention with certain parts omitted for the sake of clarity.

Referring to the drawings and particularly FIG. 1, there is shown the film exposure developing and control section 10 of a large format camera 11 useful in a lighted work space. The camera is provided with a light tight housing 12 within which most of the steps for producing photographic images upon photosensitive material, such as coated film or paper, are carried out. Access to the interior of the film handling and exposing chamber 13 is available to the operator through light excluding hand holes 14, 15.

A film storage compartment 16 having a light shielding hinged cover 17 is located at one end of the storage compartment 16 so that the operator may withdraw unexposed film 26 from the said compartment and place it in position for exposure within the chamber 13.

Figure 3:
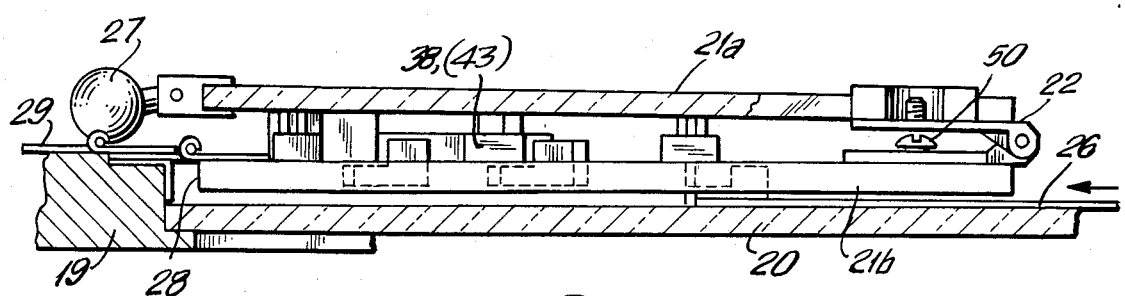
FIG. 3 is a fragmentary cross sectional view taken on line 3—3 in FIG. 2 somewhat enlarged; in the open position.
Figure 4:
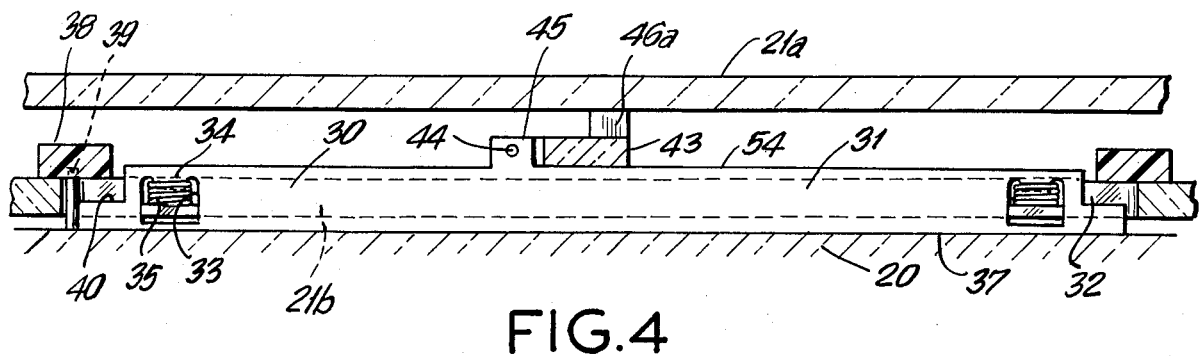
FIG. 4 is a fragmentary cross sectional view taken on line 4—4 in FIG. 2 somewhat enlarged.
Figure 5:
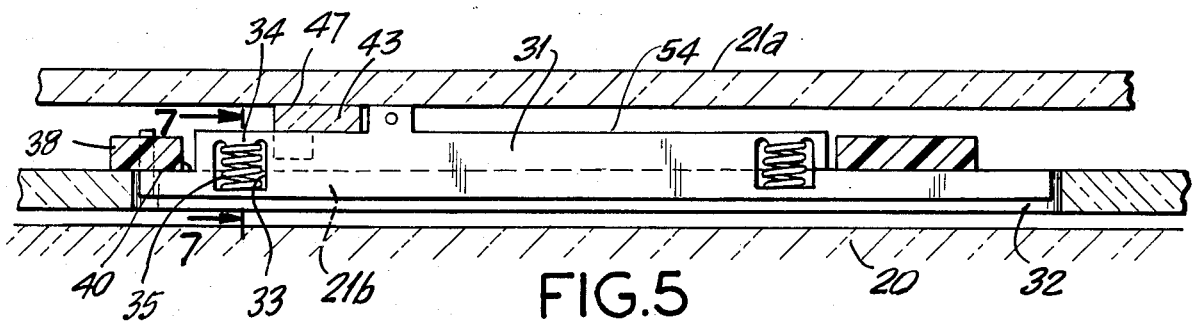
FIG. 5 is a fragmentary cross sectional view taken on line 5—5 in FIG. 1, somewhat enlarged.
Figure 6:
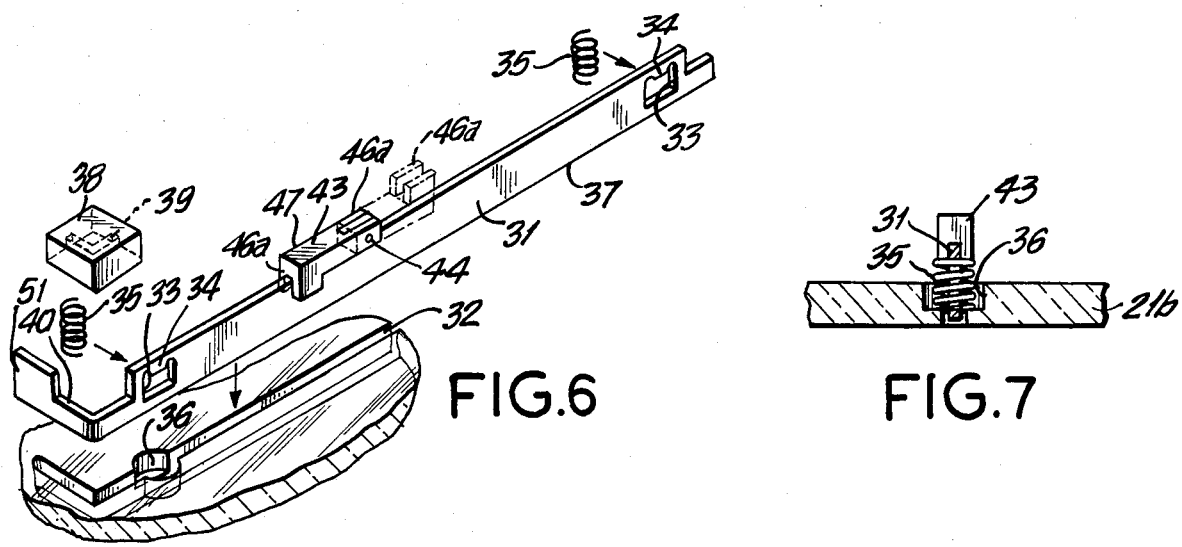
FIG. 6 is a somewhat isometric exploded view of a portion of the stop and film positioning structure according to the present invention.
Figure 7:
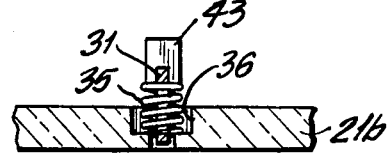
FIG. 7 is a fragmentary cross sectional view taken on line 7—7 in FIG. 5.

The bottom 18 of the film handling and exposing chamber constitutes a table 19 into a portion of which there is set a flat transparent plate 20 of glass or plastic disposed in the focal plane of the camera 11 (see FIGS. 3-5). When the operator removes unexposed photosensitive film from the storage compartment 16 it is slid or fed across the plate 20 and oriented thereon as hereinafter more fully described.

Figure 2:
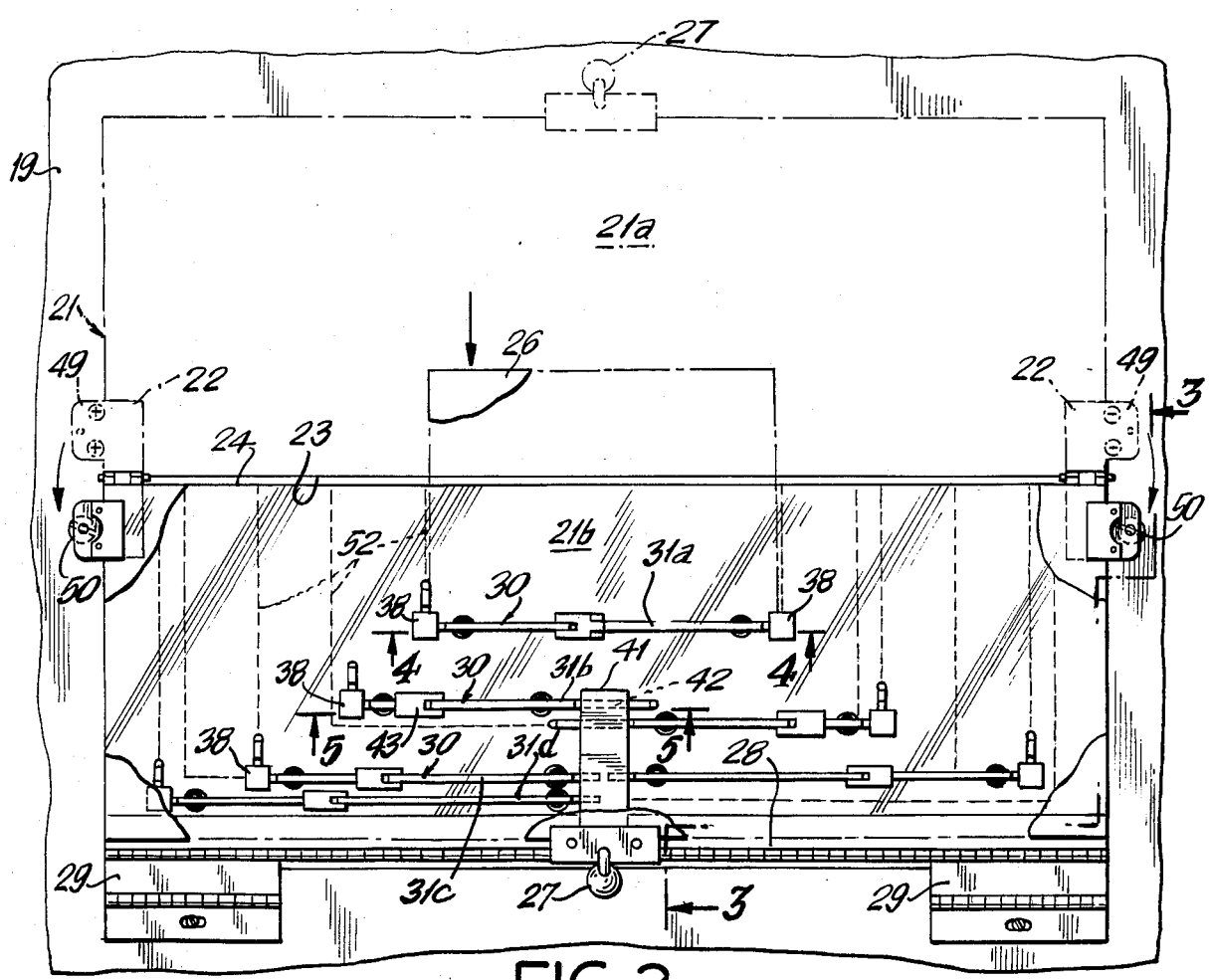
FIG. 2 is a plan view of the platen and film positioning apparatus (somewhat enlarged) of FIG. 1.

Overlying the transparent plate 20 is a platen 21 made of rigid glass plate or plastic. As best shown in FIG. 2, the platen is formed of two substantially equal sized and shaped pieces secured together by hinges 22 at the ends of their abutting margins 23,24. The platen pieces are hereinafter referred to as the front and rear platen pieces 21a, 21b in view of their location with respect to the control panel 25 of the camera 11. As more fully hereinafter set forth the platen 21 serves as a pressure plate to hold the photosensitive paper of film uniformly in contact with the transparent plate 20.

The front platen piece 21a is provided with a handle 27 at the front, free margin thereof, whereby the said platen piece may be swung upon the hinges 22 from the position shown in FIG. 1 to that shown in FIG. 2 and back again as desired.

The rear platen piece 21b is secured at its rear margin 28 to the table 19 by spaced hinges 29 which permit the entire platen to be swung upwardly from the plate 20 if desired. The rear platen also carries a plurality of spaced film positioning stops 30 which are individually extendible through elongated slots 32 in the rear platen pieces 21b into the path of individual sheets of film 26 when film is slid beneath the platen 21 and across the plate 20.

As will be seen in FIGS. 3-6, the stops 30 are in the form of upstanding elongated flat bars 31 received within elongated slots 32 in the rear platen piece 21b. The bars have at least one forwardly extending arm 51 at one or both ends thereof normal to the said bars. The arms extend through corresponding slots in the rear platen piece 21b and form a bracket-like positioning stop for the leading edge and corners of the unexposed film 26 when the bar is lowered into the path of the film as hereinafter more fully described.

The bars 31 are arranged in spaced orientation, as shown at 31a–31d in FIG. 2, to form a series of stops each located to receive the leading edge and at least one corner of a specific size of photosensitive material and locate it on the longitudinal axis of the plate 20 and squarely centered upon the image produced on the focal plane of the camera. The further purpose of the bars and their forwardly extending arms is to prevent skewing of the film beneath the platen before exposure.

The flat bars 31 are provided with small windows 33 inwardly spaced from the end thereof as best shown in FIG. 5. The windows are each rectangular in shape and formed with a downwardly depending tab 34. A small coil spring 35 is received at one end by the tab 34 and at its other end within a recess 36 in the rear platen piece 21b. Since the lower edges 37 of the bars 31 are carried within the slots 32 just below the upper surface of the platen 21 the bottom of the coil springs 35 rest upon the bottom of the recesses 36 and above the plate 21 at all times, to yieldably urge the bars 31 upwardly and off the surfaces of the plate.

A small guide block 38 having either a transverse or an "L" shaped groove 39 in the bottom thereof is secured to the top of the platen to receive the ends of the bars 31. The flat bars and arms 51 are reduced in height as shown at 40 in FIG. 6 so that they can be shifted vertically while being retained at a right angle at their common ends by the blocks 38.

In order to support the bars 31 used for larger sheets of photosensitive paper there is provided a bar guide 41 in the form of a rectangular block having transverse slots 42 in the bottom thereof to receive the ends of one or more bars 31 as shown in FIG. 2. In this manner each bar 31 is supported at each of its ends to prevent skewing.

Swingable bar control arms 43 are pivotally secured by pins 44 to small tabs 45 on the tops 54 of the bars 31a–31d. The control arms 43 are "L" shaped and bifurcated at each end. One of said ends 46 is slipped over one of the tabs 45 and swingably secured thereto. The opposite end 46a of the control arms 43 is slipped upon the bar so that its bifurcation straddles the top 54 of the said bar, bringing the top of the control arm 43 in line with the top of the small tab 45, as best shown at 47 in FIGS. 5 and 6.

It will be seen from an examination of FIG. 4 that the control arms 43 may be swung about their pivot pins 44 using only one finger into a second or actuating position in which the bifurcated free end of the arm 43 is disposed upon the top of the control bar 31a–31d and extends upwardly therefrom above the top of the small tab 45 in the path of the front platen 21a. The control arms 43 are located in a staggered position with respect to other control arms as shown in FIG. 2 so that the operator can locate and identify them by feel within the camera housing 12.

The operation of the film positioning and retaining portion of the camera will be apparent from the foregoing description as follows:

With the camera 11 loaded with a suitable supply of film 26 of the required sizes placed within the film storage compartment 16, the operator places copy upon a copy board (not shown) and turns on lamps to illuminate the copy board if necessary. An image of the copy then appears upon the transparent plate 20 in the table 19 of the camera. Focusing and any other operations necessary to square the image within the dotted lines 52 shown in FIG. 2 on the rear platen 21b is then completed. A small opaque cover 48 on top of the camera chamber 13 may be lifted for this purpose. With the cover 48 closed again to insure the light-free condition of the chamber 13, the operator next reaches through the hand holes 14, 15 and swings one or more of the control arms 43 from its position shown in full lines in FIG. 6 to that shown in dashed lines in FIG. 6. The operator next grasps the handle 27 on the front platen portion 21a and swings it back so as to come to rest adjacent the rear platen portion 21b as shown in FIG. 3. As the front platen portion 21a is brought back a small ear 49 extending outwardly from the hinge 22 comes to rest upon an upwardly 7 extending pin 50 as best shown in FIGS. 2 and 3. The height of the pin 50 causes the front platen portion 21a to raise the rear platen portion 21b slightly above the plate 20 or high enought to permit a sheet of film 26 to be slipped beneath the platen as shown in FIG. 3. The sheet of film 26 is selected from a supply of the appropriate size so that as it is guided underneath the platen it will slide into place and stop against one of the bars 31 and come to rest against the block 38 on the end of said bar. It will be observed from FIG. 4 that as the front platen 21a is swung into position overlying the rear platen portion 21b, the upstanding tab 45 will be depressed and the bottom of the bar brought into contact with the transparent plate 20. The film is thus located squarely upon the transparent table 19 so that it will lie thereon in the proper position to receive the image to be exposed. The handle 27 is then grasped by the operator and the front platen portion 21a is swung forward to overly transparent plate 20 and also to press the film uniformly against the said plate. The film is now securely held in position in its proper location and orientation for exposure. The operator can then withdraw his hands from the machine and expose the film from the control station 25.

At the end of the exposure step the operator again grasps the handle3 27 and swings the front platen portion rearwardly so as to overly the rear platen portion. The platen 21 is thus raised slightly and the exposed film may be withdrawn from under it and slipped into a film processing unit (not shown) through a side opening of the camera or above the camera as more fully set forth in U.S. Pat. No. 4,016,577. Repeated exposure may thereafter be made either of images of the same size or of differing sizes as required. In each case the film is withdrawn, slipped under the platen and properly located for exposure without the necessity of the operator withdrawing his hands from the camera chamber 13 or visual adjustment.

Having thus fully described the invention, what is desired to be secured by Letters Patent is:

1. A film positioning and retaining apparatus for a camera having an enclosed light-tight film exposure chamber a table-like support defining the bottom of said chamber comprising a transparent film receiving plate carried in the focal plane of said chamber within a window in said chamber bottom, a platen overlying the transparent plate, said platen having abutting front and rear pieces of substantially equal size and shape, first hinges swingably securing said pieces together at their abutting edges, second hinge means to swingably secure the rear platen piece to the table, a plurality of spaced elongated film positioning and orienting stops carried by the rear platen piece, a plurality of elongated slots in the rear platen piece to each receive one of said stops therethrough, an elongated flat bar shaped portion on each of said stops, spring means carried by the bar shaped portions to yieldably support the said bars within the slots and above the transparent plate, a plurality of "L" shaped swingable control arms at least one of which is secured to the top portion of each of said flat bars, bifurcated portions at each end of said control arms to receive at least a portion of the flat bar therebetween, said control arms being swingable from a first position beneath the front platen piece when said front platen piece is swung into a position overlying the rear platen piece to a second position in which the said control arm is disposed in the path of the front platen piece as it is swung rearwardly to overlie the rear platen piece, whereby a selected control arm is pushed down to compress the spring means to bring the flat bar into contact with the transparent plate to stop, locate, and position unexposed film being slid across the plate and beneath the platen prior to exposure.

2. Apparatus according to claim 1 in which the flat bar portions of the stops are normally yieldably carried by the rear platen portion above the surface of the film receiving plate.

3. Apparatus according to claim 1 in which the spring means are coil springs supported at one end by recesses in the rear platen portion and at their opposite end by the bar shaped portions.

4. Apparatus according to claim 1 in which the bar shaped portions are each provided with an upstanding tab to freely support one end of a control arm.

5. Apparatus according to claim 3 in which each of the bar shaped portions are formed with at least one window therein having a depending tab in said window to receive the opposite end of the coil spring.

6. Apparatus according to claim 5 in which each of said flat bar portions is provided with a forwardly extending arm at right angles to the longitudinal axis of said bar portion to define a film receiving and positioning corner.

7. Apparatus according to claim 6 in which a block having a groove therein to receive at least a portion of the flat bar and forwardly extending arm is secured to the top surface of the rear platen portion overlying one of the slots.

8. Apparatus according to claim 7 in which at least some of the elongated flat bars are supported by a transversely grooved guide secured to the top surface of the rear platen portion above at least one of the slots therein.

* * * * *